United States Patent
Kim

(10) Patent No.: US 11,382,433 B2
(45) Date of Patent: Jul. 12, 2022

(54) DEVICE FOR CHANGING FRAME ANGLE OF FOLDABLE ARTICLE

(71) Applicant: Characin Co., Ltd., Incheon (KR)

(72) Inventor: Sung Kwon Kim, Gyeonggi-do (KR)

(73) Assignee: Characin Co., Ltd., Incheon (KR)

( * ) Notice: Subject to any disclaimer, the term of this patent is extended or adjusted under 35 U.S.C. 154(b) by 184 days.

(21) Appl. No.: 16/844,170

(22) Filed: Apr. 9, 2020

(65) Prior Publication Data
US 2021/0289946 A1 Sep. 23, 2021

(30) Foreign Application Priority Data
Mar. 19, 2020 (KR) .................. 10-2020-0034064

(51) Int. Cl.
*A47C 19/02* (2006.01)
*A47C 17/64* (2006.01)
*A47C 4/28* (2006.01)
*F16B 7/04* (2006.01)

(52) U.S. Cl.
CPC ........... *A47C 19/025* (2013.01); *A47C 4/286* (2013.01); *A47C 17/64* (2013.01); *F16B 7/044* (2013.01); *F16B 7/0426* (2013.01); *Y10T 403/00* (2015.01)

(58) Field of Classification Search
CPC ....... A47C 19/025; A47C 4/286; A47C 17/64; F16B 7/0426; F16B 7/044; Y10T 403/342; Y10T 403/347
See application file for complete search history.

(56) References Cited

U.S. PATENT DOCUMENTS

| 5,482,237 | A | 1/1996 | Wang | |
|---|---|---|---|---|
| 8,454,084 | B2 * | 6/2013 | Lah | A47C 4/02 297/16.2 |
| 10,448,740 | B1 * | 10/2019 | Frankel | A47C 4/28 |

FOREIGN PATENT DOCUMENTS

| CN | 1559325 A | 1/2005 | |
|---|---|---|---|
| EP | 2941983 A1 * | 11/2015 | A47B 3/02 |
| KR | 20-2009-0003441 U | 4/2009 | |

(Continued)

OTHER PUBLICATIONS

Korean Intellectual Property Office, Office Action dated May 24, 2021, KR 10-2020-0034064.

(Continued)

*Primary Examiner* — David R Hare
*Assistant Examiner* — Madison Emanski
(74) *Attorney, Agent, or Firm* — The Dobrusin Law Firm, P.C.

(57) ABSTRACT

Provided is a device for changing a frame angle of a foldable article. The device combines frames using a connecting and assembling member and an elastic string and makes up a leg or a support frame of the foldable article. The connecting and assembling member with which a first end of the elastic string is combined and which has multiple combination grooves in such a manner that the frame combined with a second end of the elastic string is selectively combined with the connecting and assembling member. The first end of elastic string is combined with the connecting and assembling member, and the second end of the elastic string is combined with the frame such that the frame can be elastically operated. The frame is combined with the first end of the elastic string and is elastically insertable into or separable from the connecting and assembling member.

4 Claims, 19 Drawing Sheets

(56) References Cited

FOREIGN PATENT DOCUMENTS

| KR | 10-2012-0044577 | 5/2012 | |
| KR | 10-1585222 B | 1/2016 | |
| KR | 10-2018-0057138 A | 5/2018 | |
| WO | WO-2018097494 A1 * | 5/2018 | ............... A45B 9/00 |

OTHER PUBLICATIONS

International Search Report and Written Opinion issued by the International Searching Authority dated Jun. 23, 2021, PCT/KR2020/012052.

Korean Intellectual Property Office, Decision to Grant a Patent dated Aug. 10, 2021, KR10-2020-0034064.

* cited by examiner

[Fig. 1]
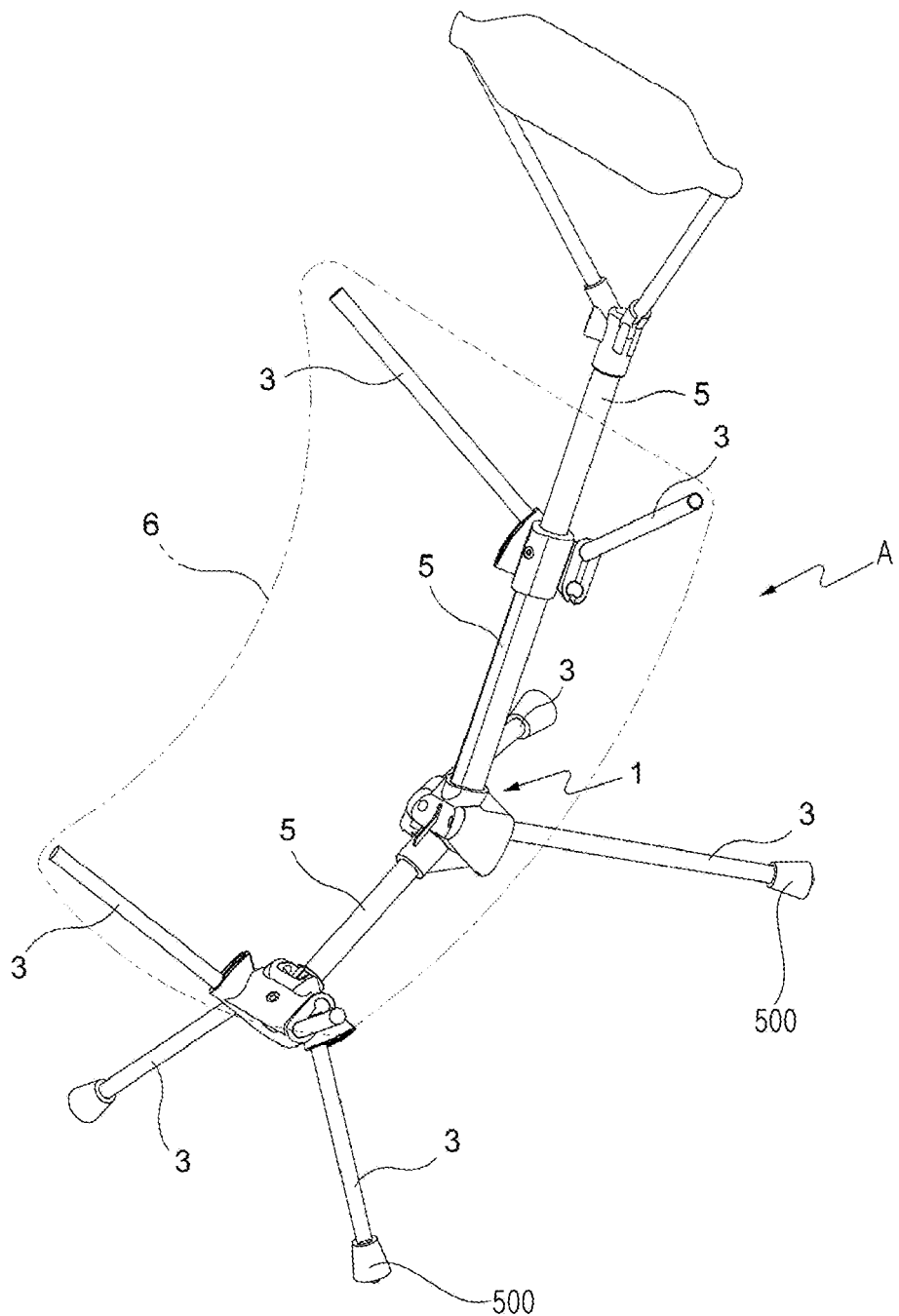

[Fig. 2]
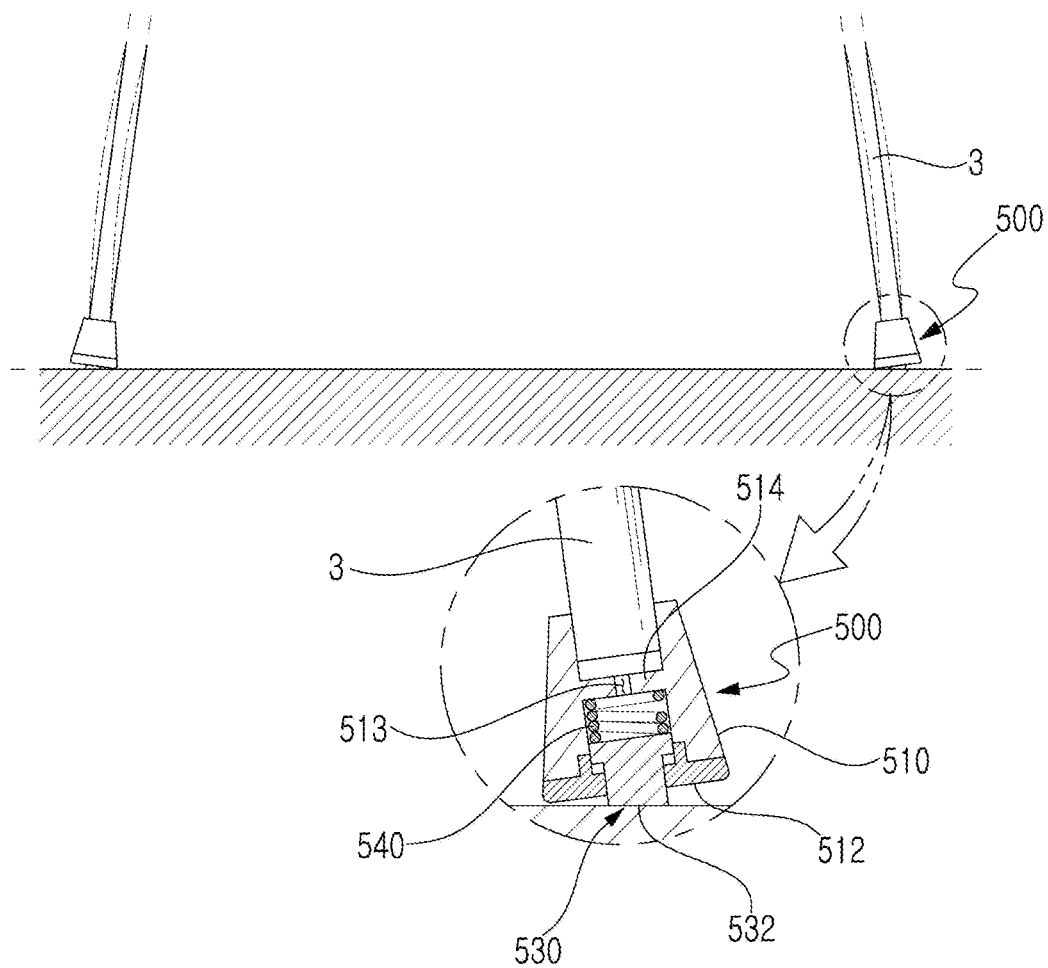

[Fig. 3]
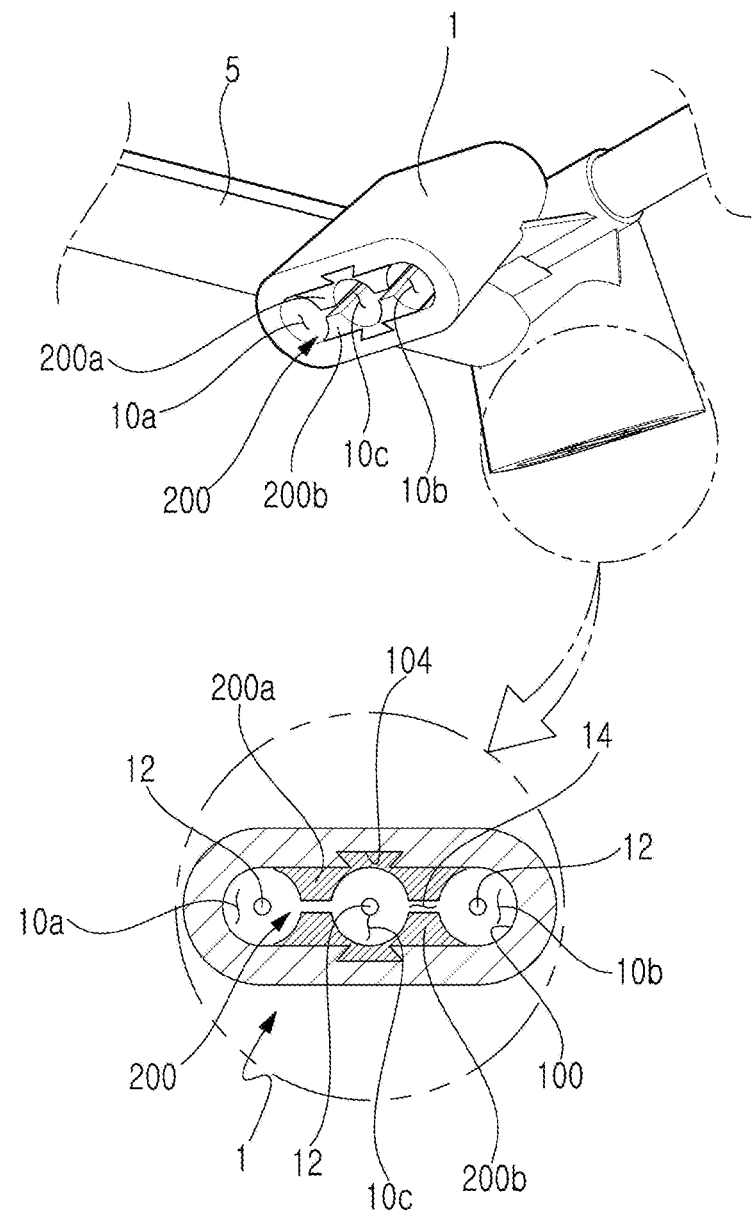

[Fig. 4]
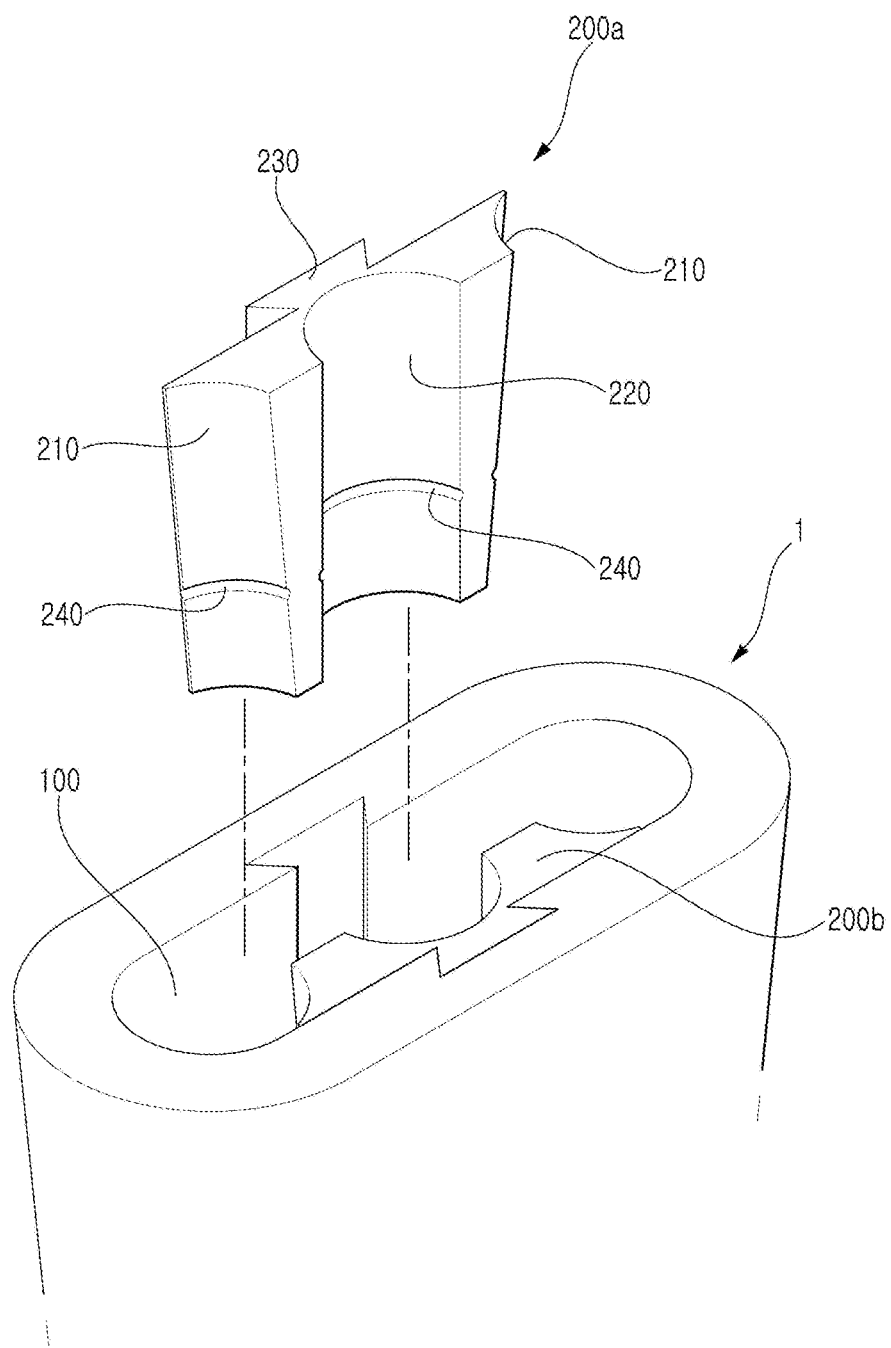

[Fig. 5]
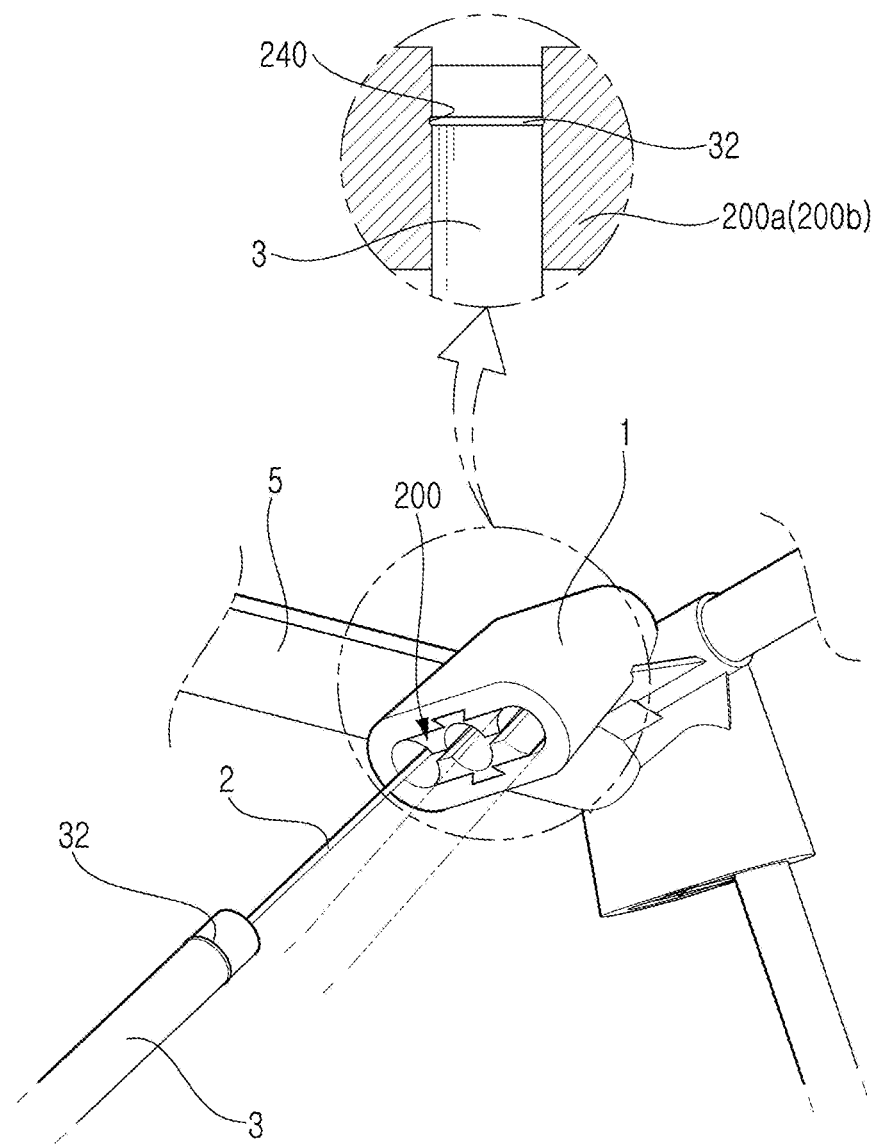

[Fig. 6]
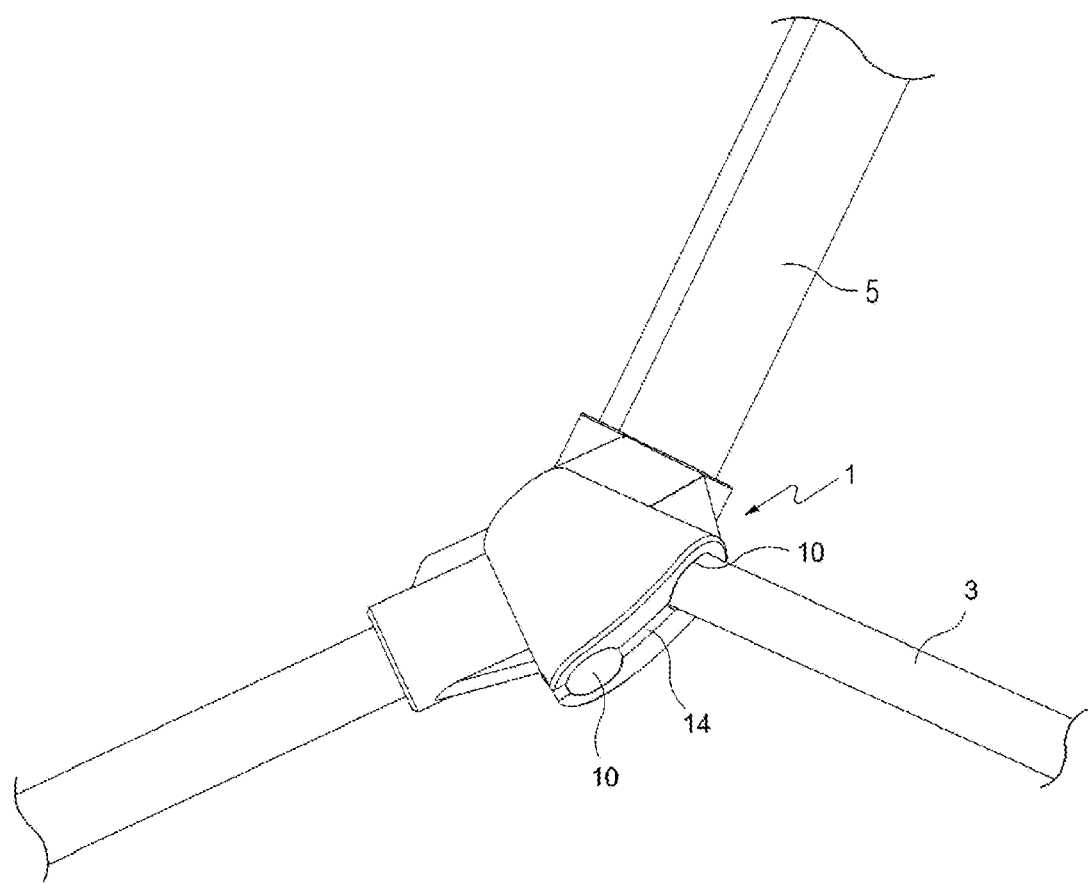

[Fig. 7]
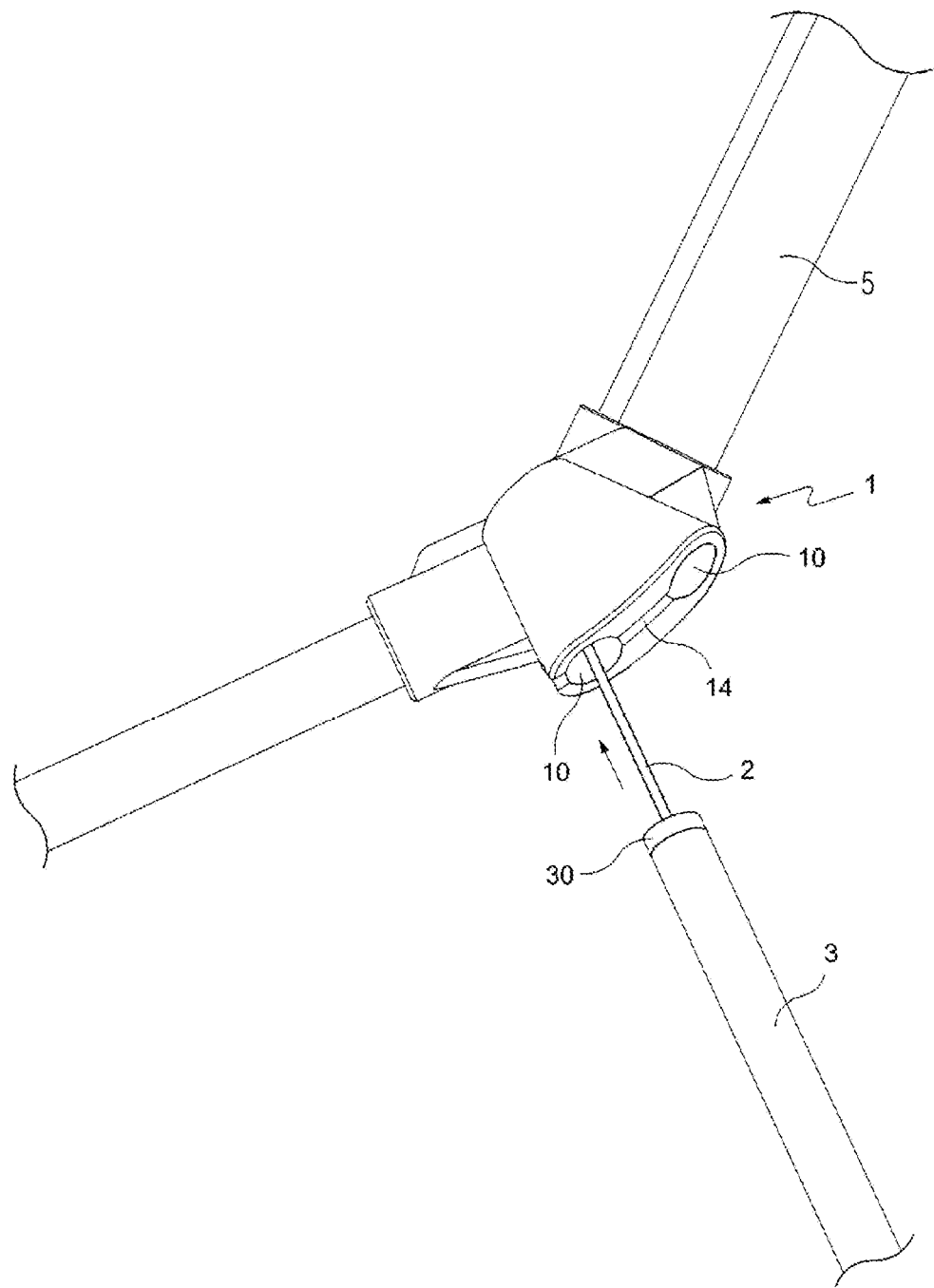

[Fig. 8]
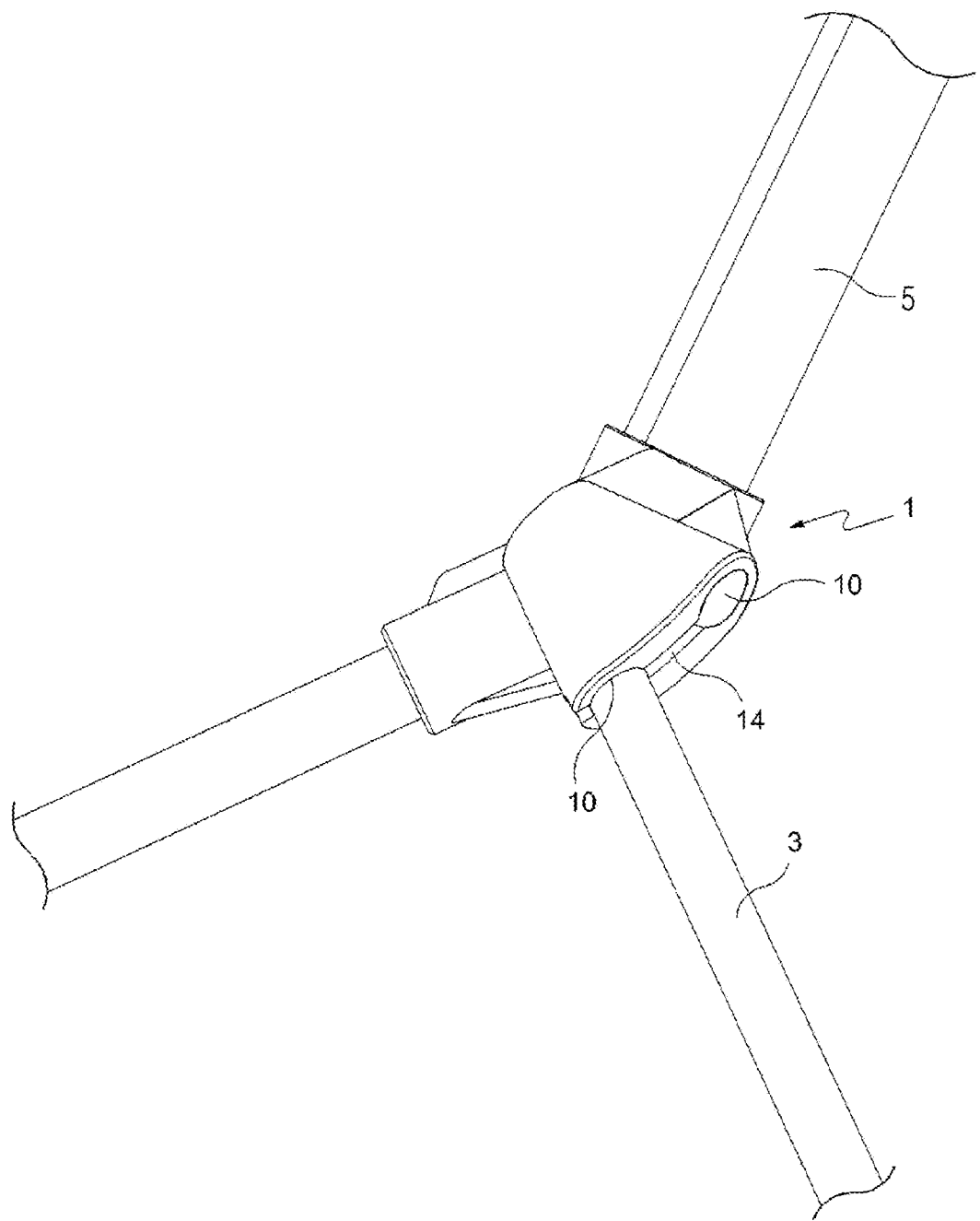

[Fig. 9]
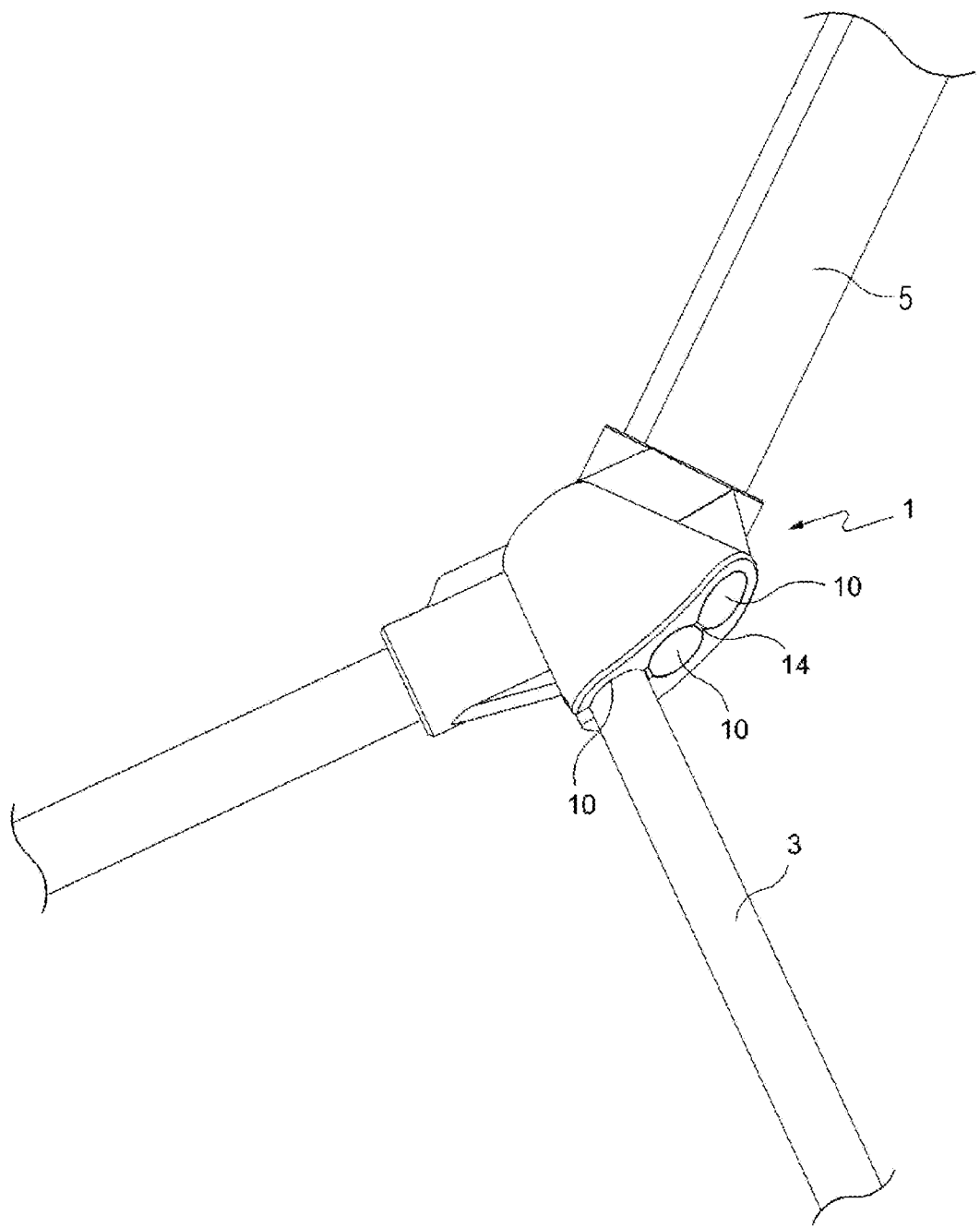

[Fig. 10]
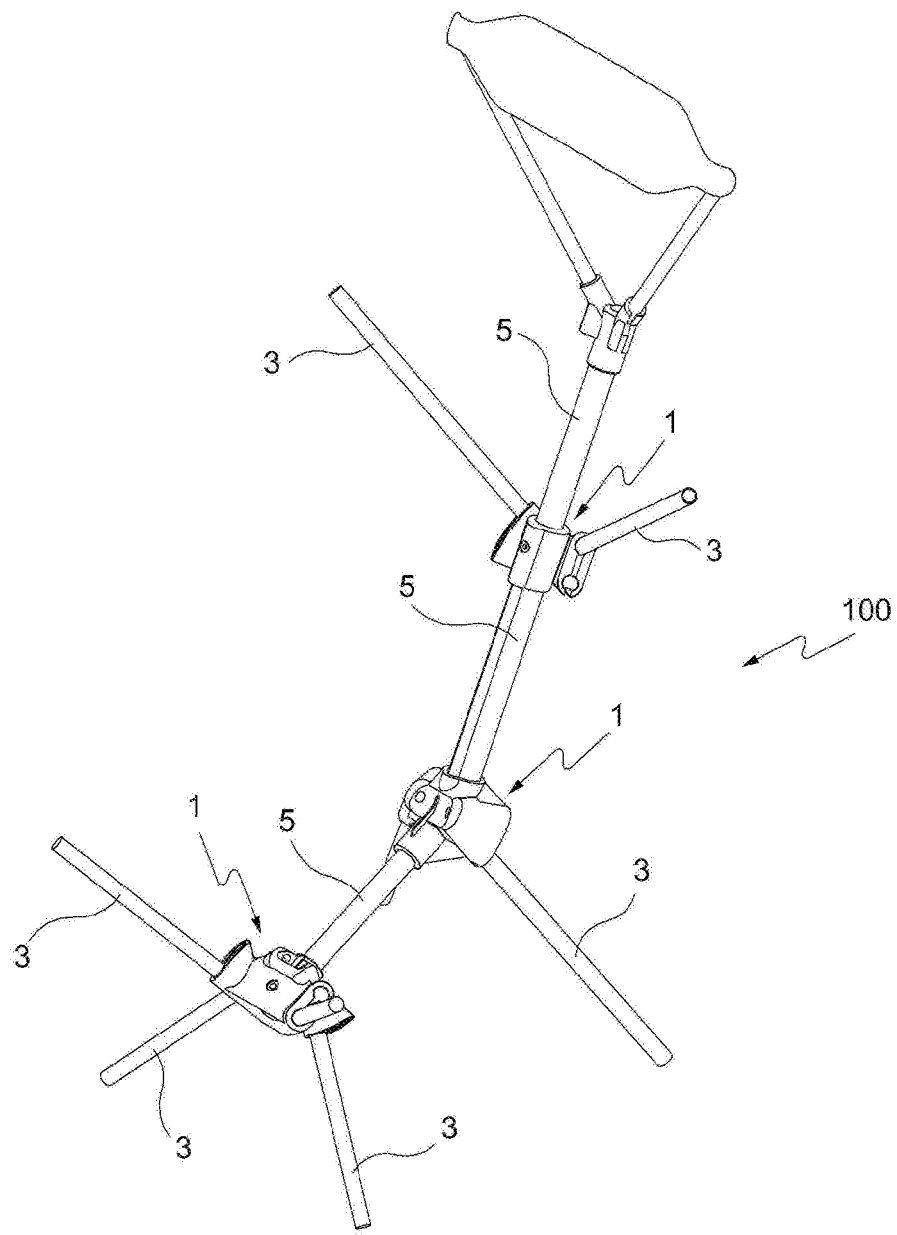

[Fig. 11]
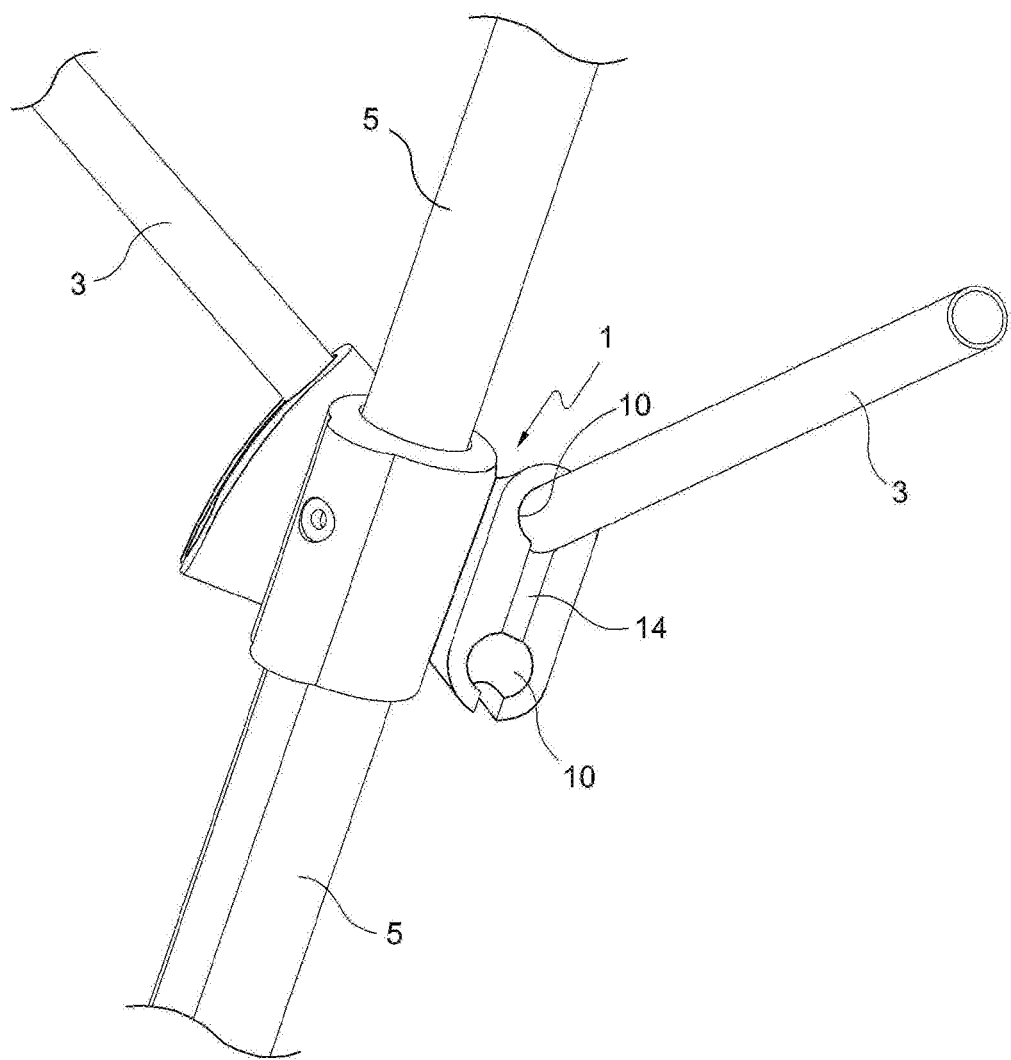

[Fig. 12]
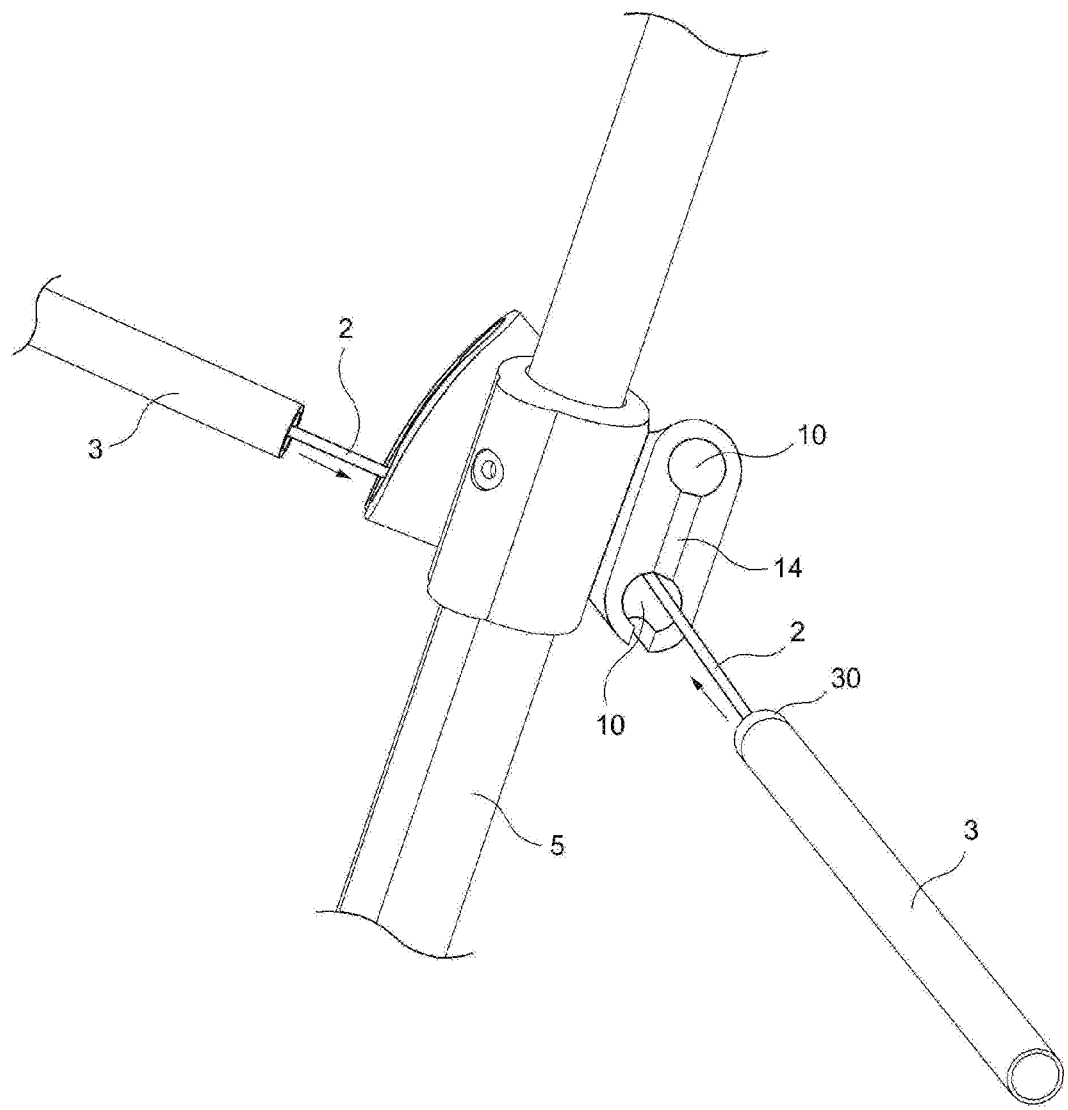

[Fig. 13]
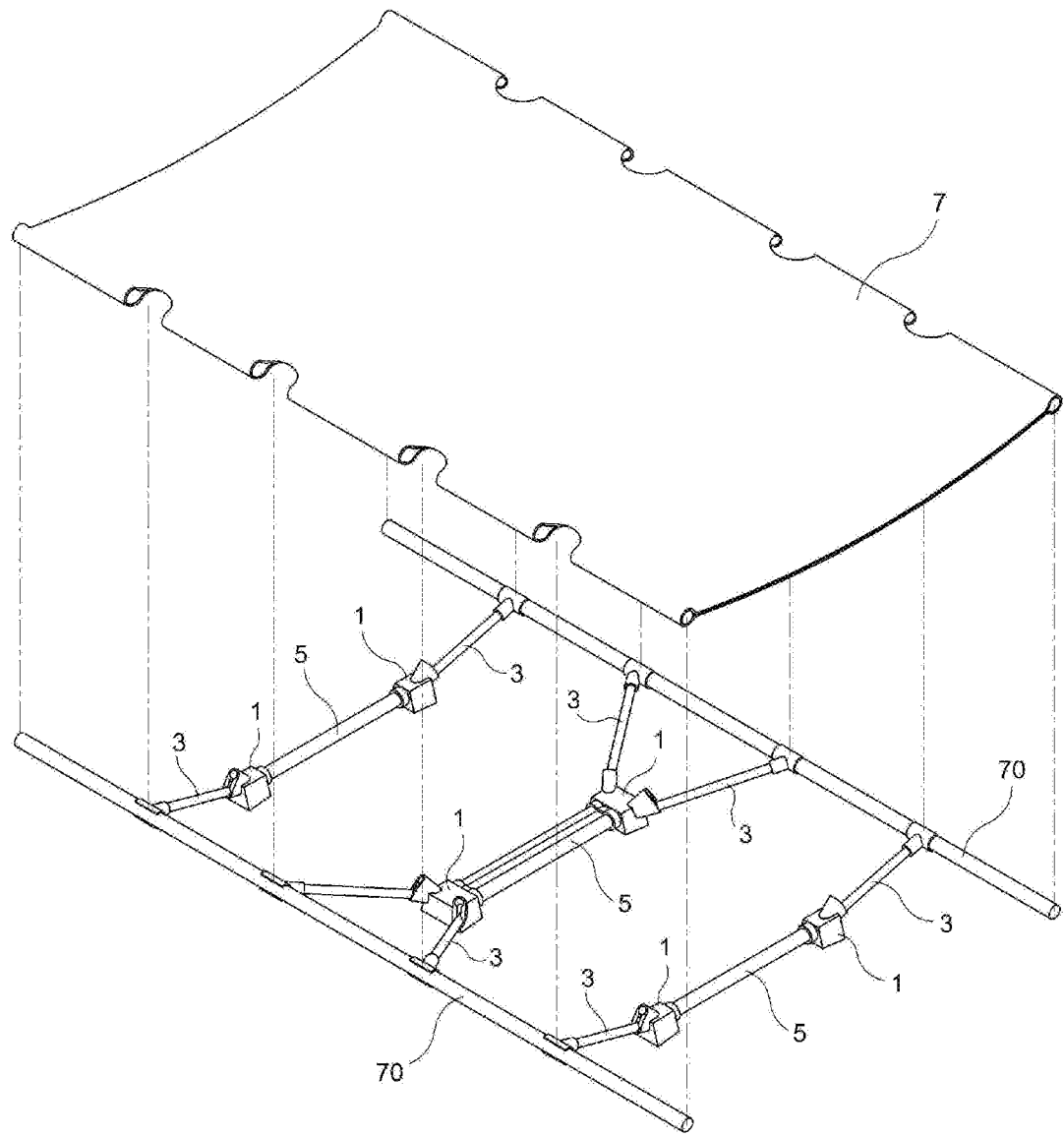

[Fig. 14]
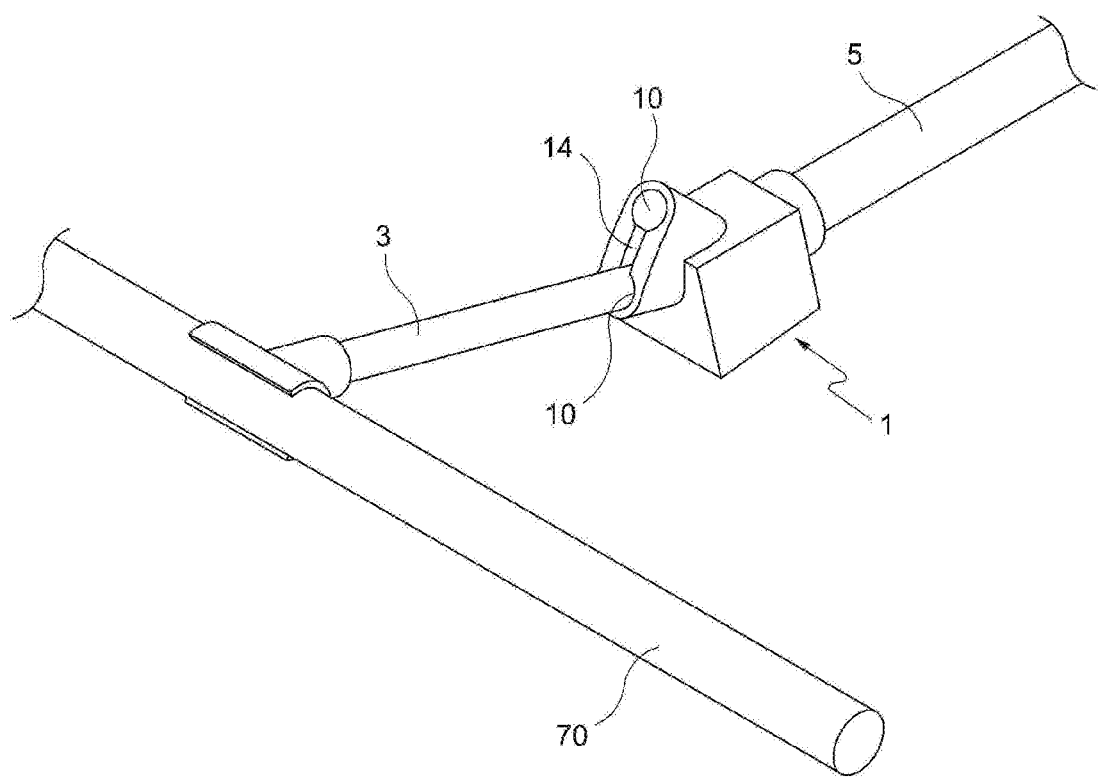

[Fig. 15]
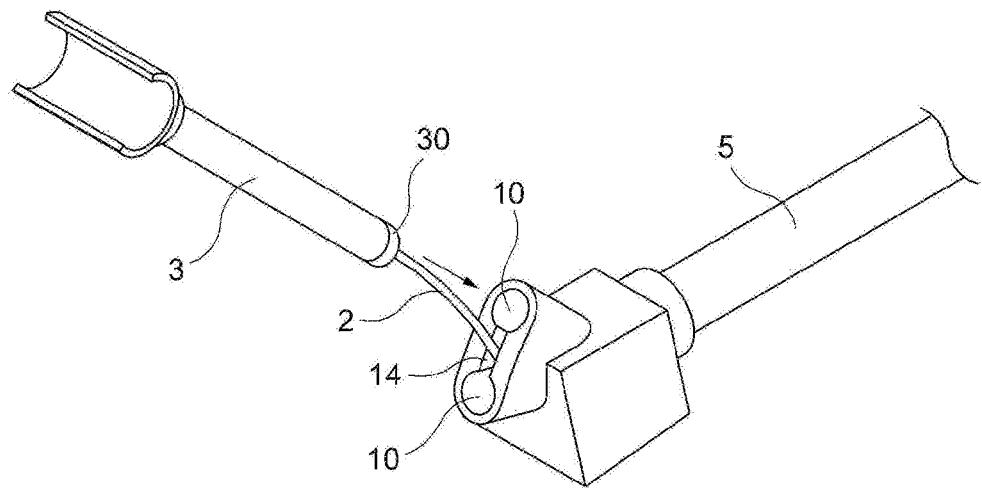
[Fig. 16]
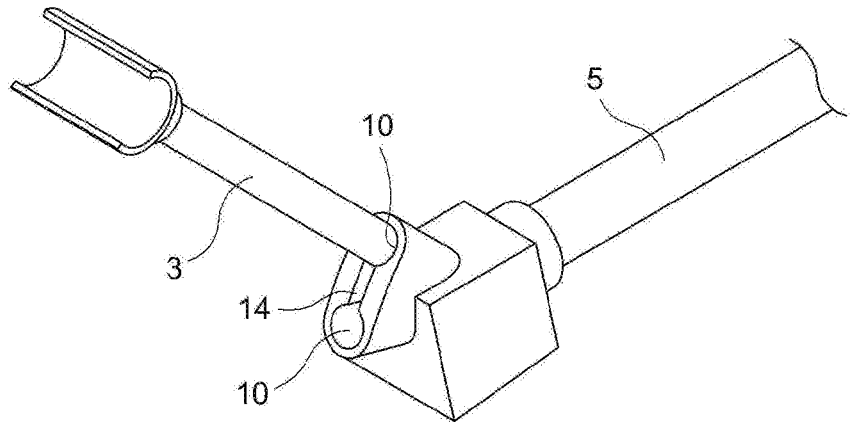

[Fig. 17]
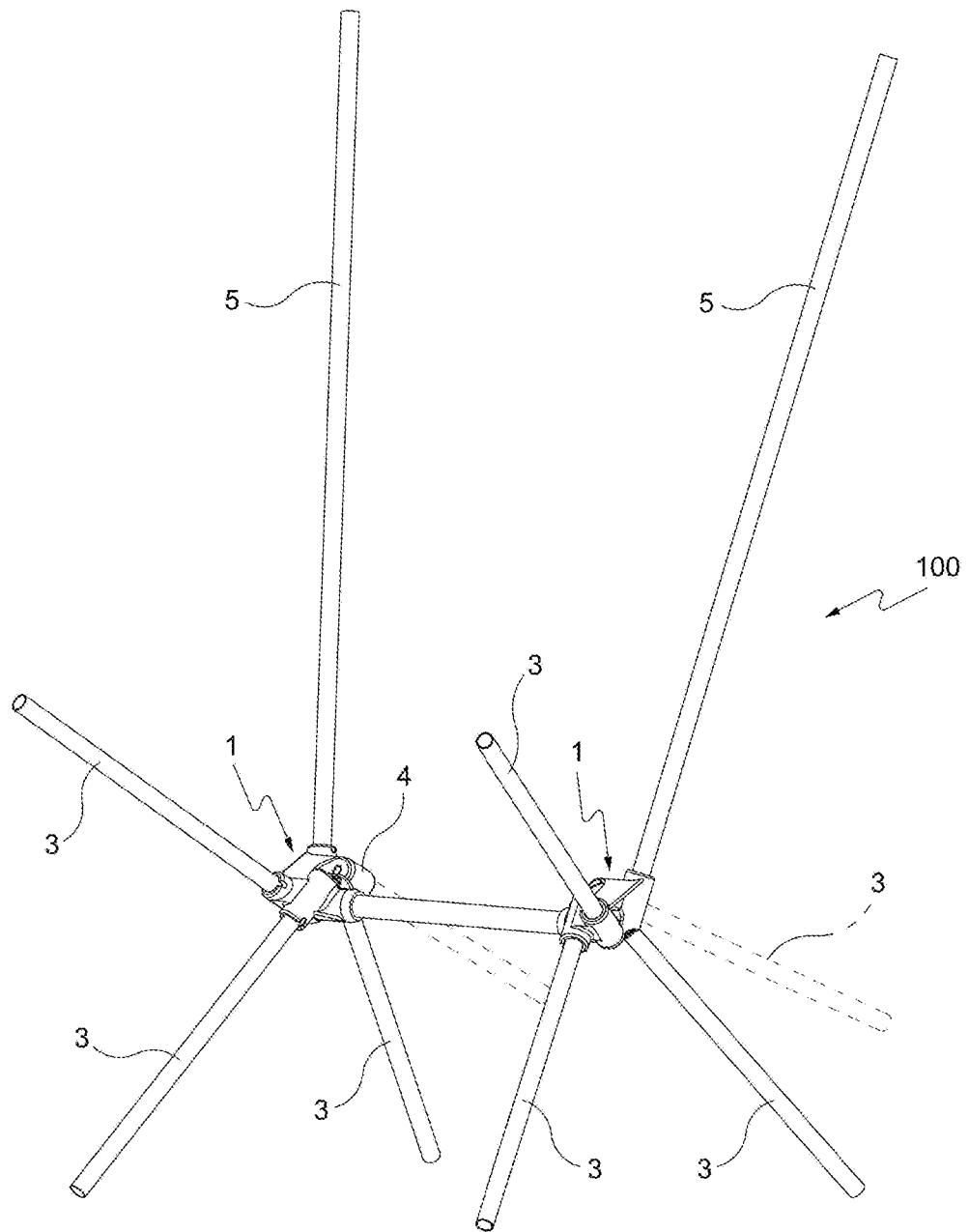

[Fig. 18]
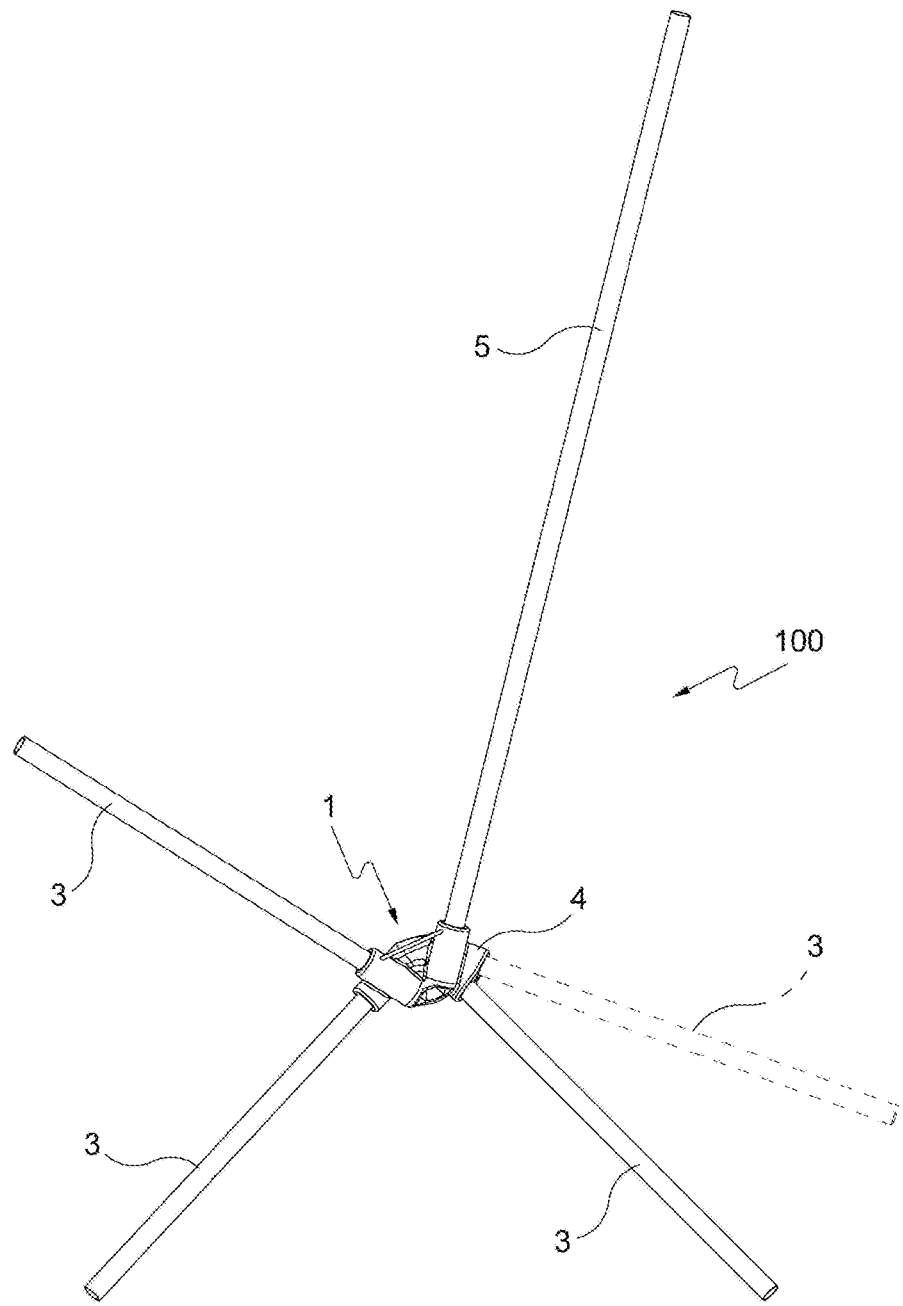

[Fig. 19]
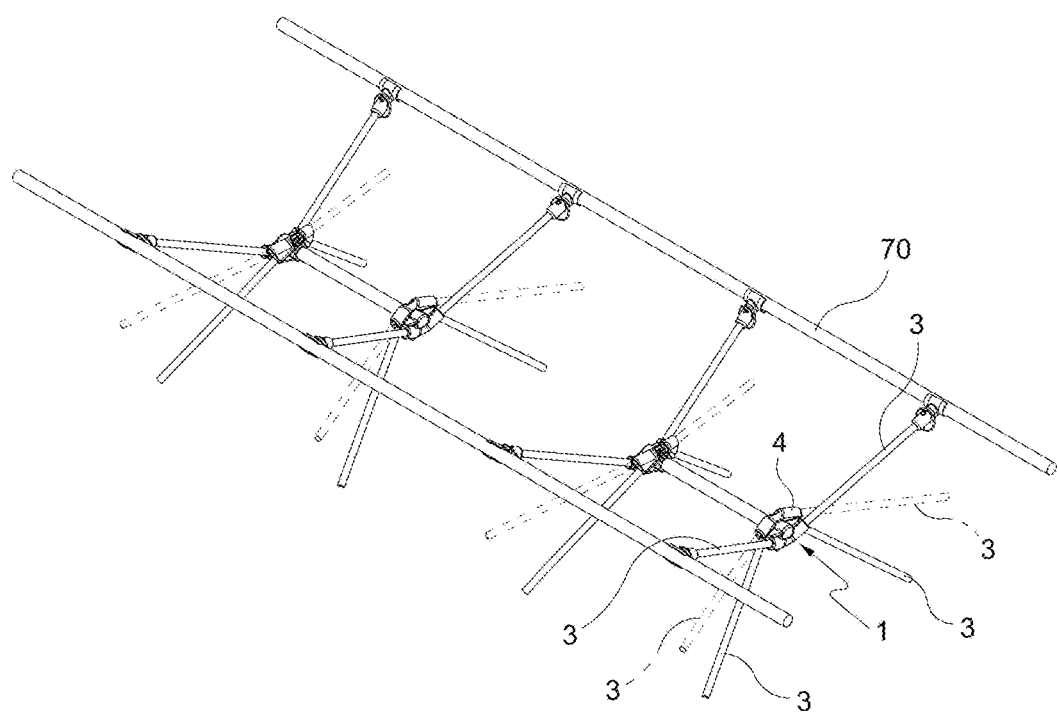

[Fig. 20]
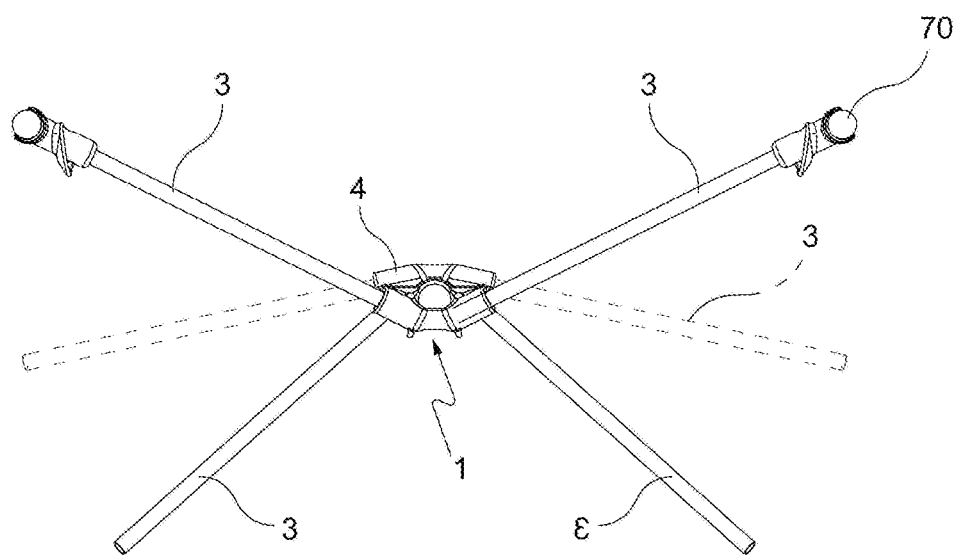

DEVICE FOR CHANGING FRAME ANGLE OF FOLDABLE ARTICLE

CROSS REFERENCE TO RELATED APPLICATION

The present application claims priority to Korean Patent Application No. 10-2020-0034064, filed Mar. 19, 2020, the entire contents of which is incorporated herein for all purposes by this reference.

BACKGROUND OF THE INVENTION

Field of the Invention

The present invention relates to a device for changing a position, is the device being capable of changing a position at which a frame with which an elastic string is combined is combined, for use in foldable articles that include a bed, a chair, a table, a tent, a foldable stick, and so on that are foldable. Particularly, the present invention relates to a device for changing a frame angle of a foldable article, into which a frame is selectively inserted to change a position of the frame and thus to adjust a height and a width of the foldable article for convenient use thereof.

Description of the Related Art

Unless otherwise described throughout the present specification, what is described in this section is not prior art against the claims in this application, and what is included in this section is not admitted as prior art.

Generally, in most cases, various foldable articles in the related art, in which frames are employed, have been developed as articles, such as chairs or beds, which are configured in such a manner that a frame is combined with one designated portion of a connecting and assembling member for connecting and assembling the frame. Thus, there is no serious inconvenience in using the foldable article in which the frame is connected and assembled.

For storage and convenient transportation, the foldable article in the related art is configured to be folded after use. However, in a case where the foldable article is actually used, a height of the foldable article cannot be adjusted. Thus, when assembled, the foldable article, like an existing fixed-type article, has to be used without any adjustment.

In addition, a mat sheet or bed sheet, which is installed on upper portions of the frames, cannot also be utilized variably, for example, in a manner that a width thereof is narrowed or widened. Thus, when assembled, the foldable article, like an existing fixed-type article, has to be used without any adjustment. Furthermore, there is no way to tighten or loosen the mat sheet or bed sheet.

An example of the related art is Korean Patent Application Publication No. 10-2012-0044577.

SUMMARY OF THE INVENTION

An object of the present disclosure is to provide a device for changing a frame angle of a foldable article. The device has a configuration in which a position at which a frame that is used in foldable articles that include a chair, a bed, and so on is installed is changed. Thus, the device is capable of adjusting a height of the foldable article or adjusting a sheet width in various ways for convenient use.

According to an aspect of the present invention, there is provided a device for changing a frame angle of a foldable article, the device combining frames using a connecting and assembling member and an elastic string to make up a leg or a support frame of each of the foldable articles that include a chair, a bed, a tent, and so on, the device including: the connecting and assembling member with which a first end of the elastic string is combined in a manner to be fixed or to pass through and which has multiple combination grooves such that the frame combined with a second end of the elastic string is selectively combined with the connecting and assembling member in an angle-changing manner at a varying installation angle; the elastic string having the first end that is combined with the connecting and assembling member in a manner to be fixed or to pass through and the second end that is combined with the frame such that the frame can be elastically operated; and the frame that is combined with the first end of the elastic string and is elastically insertable into or separable from the connecting and assembling member.

According to an embodiment of the present invention, which is disclosed below, a device for changing a frame angle of a foldable article has multiple combination grooves in such a manner that a position or angle at which a frame that is used in foldable articles that include a chair, a bed, and so on is installed is changed. Thus, the device is capable of adjusting a height of the foldable article or adjusting a sheet width in various ways for convenient use. This provides the advantage that, for all purposes, the device has applications for convenient use in various foldable articles that include a chair, a bed, and so on.

BRIEF DESCRIPTION OF THE DRAWINGS

FIG. 1 is a perspective diagram illustrating a foldable chair in which a device for changing a frame angle of a foldable article according to an embodiment is used;

FIG. 2 is an enlarged essential-portion diagram illustrating a "frame support portion" in FIG. 1;

FIG. 3 is a perspective essential-portion diagram illustrating a "connecting and assembling member" in FIG. 1;

FIG. 4 is a perspective exploded diagram illustrating the "connecting and assembling member" in FIG. 3;

FIG. 5 is a cross-sectional diagram illustrating a connection relationship between a "frame" and the "connecting and assembling member" in FIG. 1;

FIG. 6 is an enlarged essential-portion diagram illustrating one portion of the foldable chair in FIG. 1, when viewed from a different view;

FIG. 7 is a diagram illustrating a state where one portion of the frame support portion" in FIG. 2 operates;

FIG. 8 is a diagram illustrating a state where the "connecting and assembling member" in FIG. 3 operates differently;

FIG. 9 is a perspective essential-portion diagram illustrating a modification example of an essential portion according to the present invention;

FIG. 10 is a perspective diagram illustrating a state where a frame angle of a leg frame in FIG. 1 is changed;

FIG. 11 is a perspective diagram illustrating an example where a device for changing a frame angle of a foldable article according to a preferable embodiment of the present invention is used in another portion of the foldable chair;

FIG. 12 is a diagram illustrating a state where the one portion of the frame support portion" in FIG. 7 operates;

FIG. 13 is a perspective diagram illustrating an example where a device for changing a frame angle of a foldable article according to a preferable embodiment of the present invention is used in a foldable bed;

FIG. 14 is an enlarged essential-portion diagram illustrating the modification example of the essential portion in FIG. 9;

FIG. 15 is a diagram illustrating a direction in which the leg frame in FIG. 10 is to be inserted;

FIG. 16 is a diagram illustrating a state where the leg frame in FIG. 11 is inserted;

FIG. 17 is a perspective diagram illustrating an example where the device for changing a frame angle of a foldable article according to the present invention is used in another type of chair structure;

FIG. 18 is a diagram illustrating a state where the device for changing a frame angle of a foldable article in FIG. 13 operates;

FIG. 19 is a perspective diagram illustrating an example where the device for changing a frame angle of a foldable article according to the present invention is used in another type of bed structure; and FIG. 20 is a side-view diagram illustrating the leg frame in FIG. 15, when viewed from a different direction.

DETAILED DESCRIPTION OF THE INVENTION

Preferable embodiments will be described in detail below with reference to the accompanying drawings.

The embodiments will be described below in such detail that a person of ordinary skill in the art to which that the present invention pertains is enabled to implement the present invention without undue experimentation. However, this does not impose any limitation to the technical idea and the scope of the present invention.

In addition, for clarity and convenience in description, sizes, shapes, and the like of constituent elements may be illustrated in an exaggerated manner in the drawings. The terms that are defined considering a configuration and an operation that are consistent with the present invention may vary according to the operator's or user's intention or current practices. These terms should be defined in light of the present specification.

According to an embodiment of the present invention, foldable articles A that include a chair, a bed, a tent, and so on are configured in such a manner that the respective legs or support frames of the foldable articles A are constructed by connecting leg frames 3 to each other using the connecting and assembling members 1 and the elastic strings 2.

According to an embodiment, a foldable article is configured to include the connecting and assembling member 1 with which one end of the elastic string 2 is combined in a manner that is fixed or passes therethrough and which has multiple combination grooves 10 each of which has a shape that corresponds to a cross-sectional shape of the leg frame 3, in such a manner that the leg frame 3 combined with the other end of the elastic string 2 is selectively combined with the connecting and assembling member 1 in an angle-changing manner at a varying installation angle; the elastic string 2, the one end of which is combined with the connecting and assembling member 1 in a manner that is combined with or passes therethrough, the other end of which is combined with the leg frame 3, and which thus enables the leg frame 3 to elastically operate; and the leg frame 3 that is combined with the one end of the elastic string 2 and is elastically insertable or separable into or from the connecting and assembling member 1.

The foldable articles A include various foldable products, such as a chair, a bed, and a tent, that are configured to be foldable.

The connecting and assembling member 1 is manufactured using various methods, such as forming synthetic resin into the desired shape thereof (i.e., resin molding) and pouring molten metal into a die cavity or a mold cavity therefor (i.e., die casting).

As illustrated in FIGS. 3 and 4, the connecting and assembling member according to one embodiment is provided with an opening portion 100 that is a lengthwise-extending hole and includes a combination block portion 200 that partitions the opening portion 100 into multiple combination grooves 10 when it is inserted into the opening portion 100.

The combination block portion 200 is configured with first and second block pieces 200a and 200b that are inserted into the opening portion 100 and then are symmetrically combined with the connecting and assembling member 1. An opening hole 14 through which the elastic string 2 passes is famed between the first and second block pieces 200a and 200b.

An arc-shaped concave portion 210 is formed in both sides of each of the first and second block pieces 200a and 200b. A semi-circle concave groove 220 is formed in the middle thereof. An insertion protrusion 230 is formed on an external surface thereof.

An insertion groove 104 into which the insertion protrusion 230 is inserted is formed in an internal circumferential surface of the connecting and assembling member 1.

Thus, the first and second block pieces 200a and 200b are removably combined into the insertion grooves 104, respectively.

When the first and second block pieces 200a and 200b are combined into the respective insertion grooves 104 in such a manner to face each other, an opening hole 14 which is a slit-like hole is provided between the first and second block pieces 200a and 200b, and the opening portion 100 is partitioned into the multiple combination grooves 10 which include the first combination groove 10a and the second combination groove 10b provided at the lengthwise ends of the opening hole 14, respectively, and the third combination groove 10c provided in the middle.

The first combination groove 10a to the third combination 10c may have a circular shape which has the same external diameter as a cross-sectional shape of the leg frame 3, and the leg frame 3 may be selectively combined into one of the first combination groove 10a to the third combination 10c.

On the other hand, as illustrated in FIGS. 4 and 5, in order to increase the connectability of the leg frame 3, an engaging shoulder 32 may be formed on an external surface of the leg frame 3, and an engaging groove 240 may be formed on the arc-shaped portion 210 on both sides of each of the first and second block pieces 200a and 200b and on the concave groove 220 in the middle of each thereof.

The engaging shoulder 32 or the engaging groove 240 is formed to be arch-shaped in the horizontal direction.

Thus, the leg frame 3 may be selectively combined into the first combination groove 10a to the third combination groove 10c. When this is done, the engaging should 32 is combined into the engaging groove 240, thereby achieving the high connectability.

In the connecting and assembling member 1, a combination through-hole 12 of which a size is smaller than that of the combination groove 10 is formed to pass through an internal bottom of each of the multiple combination grooves 10, into which the leg frame 3 is combined in such a manner that the elastic string 2 is combined into or passes through the combination through-hole 12.

In addition, an opening hole 14 in the shape of a small slit having a width smaller than the diameter of the combination groove, is formed between each of the multiple combination grooves 10 in such a manner that the elastic string passes through the opening hole 14. Thus, although positioned in any combination groove 10 of the multiple combination grooves 10, the elastic string 2 can move through the opening hole 14.

At this point, distances among the multiple combination grooves 10 are shorter as the respective internal ends of the combination grooves are approached. Thus, fixed angles are made among the multiple combination grooves 10. Accordingly, although the distances among the combination grooves are short, the angle can be changed to a relatively-large decree, and thus, the article can be stably supported.

In addition, various configurations are employed according to the number of leg frames 2 and a position at which the leg frame 3 is installed, which are required in terms of characteristics of the foldable article A. If necessary, a portion at which a separate fixation frame 5 is fixedly installed is also prepared in advance.

As the elastic strings 2, various types of strings may be utilized such as high elastic rubber bands and springs. A configuration is employed in which the elastic string 2 is elastically combined into the combination groove 10 in the connecting and assembling member 1. With this configuration, in a case where the leg frame 3 is separated from the combination groove 10 to disassemble the leg frame 3, the elastic string 10, which itself has flexibility, serves to freely disassemble the leg frame 3, and to enable the leg frame 3 to operate while maintaining a connected state without being separated completely independently of the connecting and assembling member 1.

The leg frame 3 is manufactured from a hollow metal pipe or a synthetic resin pipe, which is excellent in hardness. Preferably, a configuration is employed in which a finishing member 30 having a combination through-hole 12 into which the elastic string 2 is to be inserted for convenient combination is fixedly combined with one end portion of the leg frame 3.

At this point, in a case where a foldable chair, as the foldable article A, is configured, without the fixation frame 5 in the center, which will be described below, the leg frame 3 may be employed as a portion that is positioned on a lower portion of the connecting and assembling member 1 and serves as a leg, and may be employed as a portion that is positioned on an upper portion of the connecting and assembling member 1 for combination with a seat and supports and fixes the seat.

In addition, in a case where a foldable bed, as the foldable article A, is configured, the leg frame 3 is assembled, in the upward position, to each of the connecting and assembling members 1 that are fixedly installed on both sides of the fixation frame 5 and thus can serve as both a leg and a support.

On the other hand, a finishing member 500 is combined with an end portion of the leg frame 3 that is used as a leg. Thus, when supported on the ground, the leg frame 3 can be prevented from sliding.

As illustrated in FIG. 2, the finishing member 500 is configured to include a main body 510, with whose one end an end portion of the leg frame 3 is combined, a tip member 530 that is combined with the other end of the main body 510, and a string 540 that is mounted within the main body 510 in such a manner as to elastically support the tip member 530.

A stopper 512 is removably combined with a lower portion of the main body 510.

An upper portion of the spring 540 is supported within the main body 510. A partition wall 514 that supports an end portion of the leg frame 3 is formed within the main body 510. A water drain hole 513 is formed in the partition wall 514, and thus rainwater is discharged through the water drain hole 513.

The tip member 530 is formed in such a manner that an end portion thereof has an inclination surface 532 considering an inclination angle at which the tip member 530 is supported on the ground.

Thus, when the tip member 530 is supported on the ground, the tip member 530 can elastically move forward and backward due to the elasticity of the spring 540. The tip member 530 is firmly stuck in the ground in a state where due to the weight of the tip member 530, a portion thereof moves backward into the finishing member 500. Thus, the sliding can be prevented.

On the other hand, as illustrated in FIGS. 10 and 11, in a case where a foldable chair, as the foldable article A, is configured, the fixation frame 5 refers to a frame that is positioned in the center and is fixedly connected to multiple connecting and assembling members 1. In a case where a foldable bed, as the foldable article A, is configured, the fixation frame 5 refers to a frame that is fixedly installed between the connecting and assembling members 1 positioned on both sides thereof.

Reference numerals 6 and 7 refer to a chair sheet and a bed sheet that is combined with a support bar 70, respectively, which are not described.

The operation of the present invention that is configured as described above is as follows.

First, a case where the leg frame 3 is used as a leg in a lower portion of a foldable chair as the foldable article A is assumed. When the leg frame 3 is combined into the frontmost combination groove 10 of the multiple combination grooves 10 formed in the connecting and assembling member 1, a leg of the foldable chair that uses the leg frame 3 is at its greatest height. When the leg frame 3 is combined into the rearmost combination groove 10 of the multiple combination grooves 10 formed in the connecting and assembling member 1, a leg of the foldable chair that uses the leg frame 3 is at its smallest height. This provides the advantage that, although a user sits on the chair sheet 6 and fully leans backward, the user can use the foldable chair, maintaining a properly-balanced posture.

A case where the leg frame 3 is used in a structure for supporting the chair sheet 6 in an upper portion of the foldable chair as the foldable article A is described.

When the leg frame 3 is combined into the innermost combination groove 10 of the multiple combination grooves 10 formed in the connecting and assembling member 1, the leg frames 3 on both sides are positioned at points where a distance therebetween is shortest. Thus, in a case where the chair sheet 6 is combined with an end portion of the leg frame 3, although the chair sheet 6 is not spread into a tightened state, the body of the user is wrapped at a small height, thereby providing the comfortability. When the leg frame 3 is combined into the outermost combination groove 10 of the multiple combination grooves 10 formed in the connecting and assembling member 1, the leg frames 3 on both sides are positioned at points where a distance therebetween is greatest. Thus, the chair sheet 7 is spread into the tightened state. The user can use the foldable chair in which the elasticity of the chair sheet 7 can be maintained at a great height.

On the other hand, a case where the leg frame 3 is used for adjusting a height of a leg of a foldable bed while supporting the bed sheet 7 in an upper portion of the foldable bed as the foldable article A is described (refer to FIG. 13).

When the leg frame 3 is combined into the innermost combination groove 10 of the multiple combination grooves 10 formed in the connecting and assembling member 1, the leg frames 3 on both sides are positioned at points where a distance therebetween is shortest. Thus, in a case where the support bar 70 is combined with an end portion of the leg frame 3 and the bed sheet 7 is spread, although the bed sheet 7 is not spread into a very tightened state, the user can use the foldable bed of which the comfortability can be maintained in a state where the height of the leg is relatively great. When the leg frame 3 is combined into the outermost combination groove 10 of the multiple combination grooves 10 formed in the connecting and assembling member 1, the leg frames 3 on both sides are positioned at points where a distance therebetween is greatest. Thus, the bed sheet 7 is spread into a more-tightened state. The user can use the foldable bed in which the elasticity of a bed sheet can be maintained in a state where the height of the leg is relatively small.

As described above, according to an embodiment of the present invention, which is described above, the device for changing a frame angle of a foldable article has multiple combination grooves 10 in such a manner that a position or angle at which the leg frame 3 that is used in foldable articles A that include a chair, a bed, and so on is installed is changed. Thus, the device is capable of adjusting a height of the foldable article A or adjusting a sheet width in various ways for convenient use. For all purposes, the device can also have applications for convenient use in various foldable articles A that include a chair, a bed, and so on.

The preferable embodiments are described above. However, it will be apparent to a person of ordinary skill in the art that various modifications and alterations are possible without departing from the gist and scope of the invention. These modifications and alternations should be construed as falling within the scope of the following claims.

What is claimed is:

1. A device for changing a frame angle of a foldable article, the device combining leg frames using a connecting and assembling member and an elastic string and thus makes up a leg or a support frame of the foldable article, the device comprising:
   the connecting and assembling member with which a first end of the elastic string is combined in a manner to be fixed or to pass through and which has a plurality of combination grooves each of which has a shape that corresponds to a cross-sectional shape of a leg frame wherein the leg frame combined with a second end of the elastic string is selectively combined with the connecting and assembling member in an angle-changing manner at a varying installation angle;
   the elastic string having the first end that is fixed to or that passes through the connecting and assembling member and the second end that is combined with the leg frame wherein the leg frame is elastically operable; and
   the leg frame that is combined with the second end of the elastic string and that is elastically insertable into or separable from the connecting and assembling member,
   wherein an opening portion that is a lengthwise-extending hole is formed in the connecting and assembling member, and the connecting and assembling member includes a combination block portion that forms a plurality of combination grooves by partitioning the opening portion,
   the combination block portion is configured with first and second block pieces that are inserted into the opening portion and then are symmetrically combined with the connecting and assembling member,
   wherein an arc-shaped concave portion is formed in both sides of each of the first and second block pieces, a semi-circle concave groove is formed in the middle thereof, and an insertion protrusion is formed on an external surface thereof, and
   insertion grooves into which the insertion protrusions, respectively, are inserted are formed in an internal circumferential surface of the connecting and assembly member and thus, the first and second block pieces are removably combined into the insertion groves, respectively.

2. The device according to claim 1, wherein
   an opening hole through which the elastic string passes is formed between the first and second block pieces, and
   the plurality of combination grooves are formed in both sides of the combination block portion or in the middle thereof.

3. The device according to claim 1, wherein an engaging shoulder is formed on an external surface of the leg frame, and
   an engaging groove is formed on the arc-shaped concave portion on both sides of each of the first and second block pieces and on the semi-circle concave groove in the middle of each thereof.

4. The device according to claim 1, wherein
   a finishing member is combined with an end portion of the leg frame and is supported on the ground, and
   the finishing member includes:
   a main body having a first end with which an end portion of the leg frame is combined;
   a tip member that is combined with a second end of the main body; and
   a spring that is mounted within the main body in such a manner as to elastically support the tip member.

* * * * *